United States Patent
Nishiwaki

(10) Patent No.: US 9,346,322 B2
(45) Date of Patent: May 24, 2016

(54) PNEUMATIC TIRE WITH TREAD HAVING SHOULDER LATERAL GROOVES

(75) Inventor: Takashi Nishiwaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1120 days.

(21) Appl. No.: 13/409,485

(22) Filed: Mar. 1, 2012

(65) Prior Publication Data
US 2012/0222788 A1 Sep. 6, 2012

(30) Foreign Application Priority Data

Mar. 2, 2011 (JP) ................................. 2011-045455

(51) Int. Cl.
*B60C 11/13* (2006.01)
*B60C 11/03* (2006.01)
*B60C 11/12* (2006.01)

(52) U.S. Cl.
CPC ............ *B60C 11/0306* (2013.04); *B60C 11/12* (2013.01); *B60C 11/0309* (2013.04); *B60C 11/1369* (2013.04); *B60C 2011/0355* (2013.04); *B60C 2011/0365* (2013.04); *B60C 2011/0369* (2013.04); *B60C 2011/0383* (2013.04)

(58) Field of Classification Search
CPC ................... B60C 11/0306; B60C 2011/0369; B60C 2011/0365; B60C 11/0309; B60C 11/1369

See application file for complete search history.

(56) References Cited

U.S. PATENT DOCUMENTS

| | | | | |
|---|---|---|---|---|
| 5,085,259 A | * | 2/1992 | Goergen | B60C 11/11 152/209.18 |
| 5,580,404 A | * | 12/1996 | Hitzky | B60C 11/1369 152/209.22 |
| 2007/0012389 A1 | * | 1/2007 | Ito | B60C 11/1369 152/209.22 |

FOREIGN PATENT DOCUMENTS

| | | | |
|---|---|---|---|
| JP | 02-179510 A | * | 7/1990 |
| JP | 10-100615 A | | 4/1998 |
| JP | 2007-182094 A | | 7/2007 |

\* cited by examiner

*Primary Examiner* — Steven D Maki
(74) *Attorney, Agent, or Firm* — Birch, Stewart, Kolasch & Birch, LLP

(57) ABSTRACT

A pneumatic tire has a tread portion that includes a shoulder main groove and a plurality of shoulder lateral grooves. The shoulder main groove is disposed in the nearest side of a tread edge on the tread portion and extends continuously in a circumferential direction of the tire. The shoulder lateral grooves each extend from the shoulder main groove to the tread edge to form a plurality of shoulder blocks. The shoulder lateral grooves have a first portion extending from the shoulder main groove axially outside the tire and including at angle of not less than 70 degrees and less than 90 degrees with respect to a circumferential direction of the tire, and the second portion extending from the first portion axially outside the tire and inclining in a reverse direction of the first portion at angle of from 40 to 70 degrees with respect to the circumferential direction.

6 Claims, 4 Drawing Sheets

PNEUMATIC TIRE WITH TREAD HAVING SHOULDER LATERAL GROOVES

BACKGROUND OF THE INVENTION

1. Field of the Invention

The present invention relates to a pneumatic tire that is improved in drainage performance while maintaining uneven wear resistance.

2. Description of the Background Art

There is a known pneumatic tire with a block pattern at a tread portion in which a plurality of blocks are formed by a plurality of circumferentially extending longitudinal grooves and a plurality of axially extending lateral grooves. In recent years, such a pneumatic tire has been improved in uneven wear resistance by increasing pattern rigidity of the blocks.

In general, pattern rigidity can be effectively increased by reducing widths and depths of longitudinal grooves and lateral grooves. However, if longitudinal grooves and lateral grooves are made smaller in width and depth, groove capacity is reduced to deteriorate drainage performance. In particular, shoulder lateral grooves connected to tread edges contribute considerably to drainage performance, and therefore simply decreasing the groove depth leads to significant deterioration of drainage performance. Thus, there is a trade-off relation between improvement of drainage performance and assurance of uneven wear resistance, and it is difficult to ensure compatibility between the two.

SUMMARY OF THE INVENTION

The present invention is revised in light of the foregoing problem, and a main object of the present invention is to provide a pneumatic tire improved in drainage performance while maintaining uneven wear resistance, basically by bending shoulder lateral grooves and defining angles of installation of the grooves within specific ranges, and defining bent positions and groove depths in association with each other.

According to the present invention, a pneumatic tire having a tread portion comprises a shoulder main groove and a plurality of shoulder lateral grooves provided on the tread portion, the shoulder main groove being disposed in the nearest side of a tread edge on the tread portion and extending continuously in a circumferential direction of the tire, the shoulder lateral grooves each extending from the shoulder main groove to the tread edge, a plurality of shoulder brocks divided between the shoulder main groove and the tread edge, wherein the shoulder lateral groove comprises the first portion which extends from the shoulder main groove toward the axially outside of the tire and inclines at angle of not less than 70 degrees and less than 90 degrees with respect to a circumferential direction of the tire, and the second portion which extends from the first portion toward the axially outside of the tire and inclines to a reverse direction of the first portion at angle of from 40 to 70 degrees with respect to the circumferential direction of the tire, the shoulder lateral groove has a shallow part having the minimum groove depth at a connection position between the first portion and the second portion, and the groove depth of the shoulder lateral groove increases from the shallow part toward axially inside and outside of the tire.

DESCRIPTION OF THE PREFERRED EMBODIMENTS one embodiment of the present invention will be described below with reference to the drawings.

Figure 1:
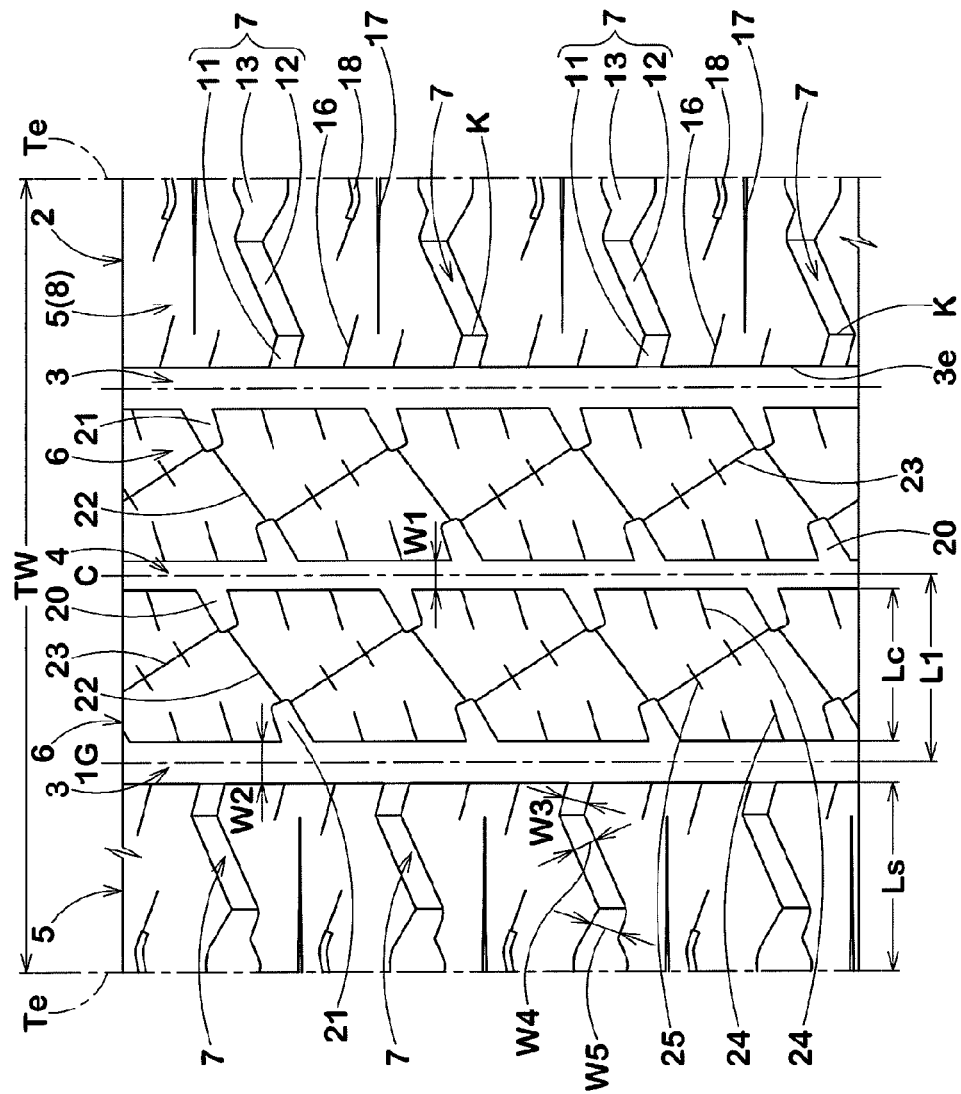
FIG. 1 is a development view of a tread portion of a pneumatic tire in one embodiment of the present invention.
Figure 2:
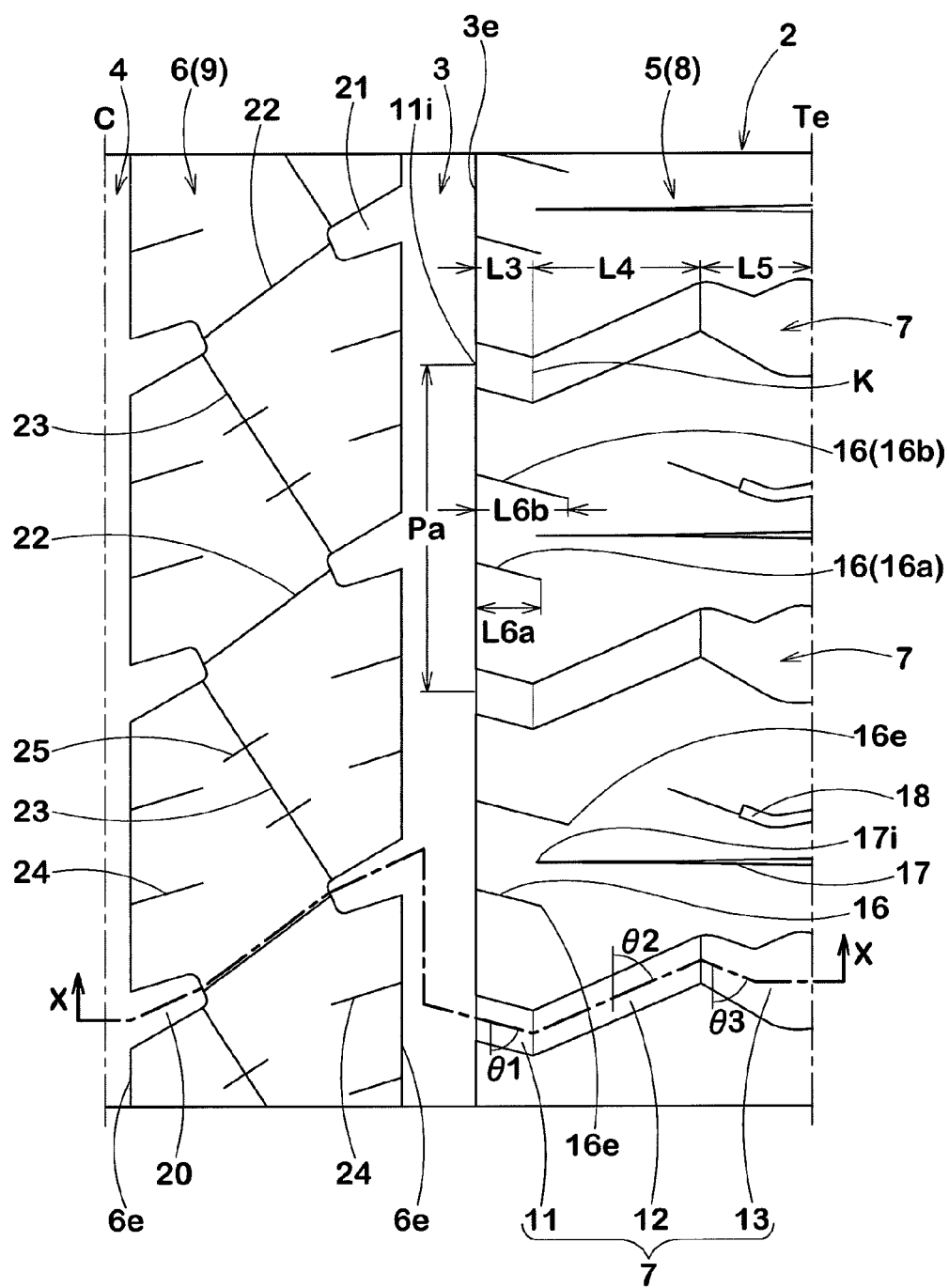
FIG. 2 is a partially enlarged view of FIG. 1.

As shown in FIGS. 1 and 2, a pneumatic tire 1 of the present embodiment (hereinafter, also referred to simply as "tire") is suitably used in light trucks, for example. The tire 1 has a tread portion 2 with a pair of shoulder longitudinal grooves 3 disposed in the nearest side of tread edges Te and extending continuously in a circumferential direction of the tire, and a center longitudinal groove 4 extending continuously on a tire equator C in the circumferential direction of the tire, for example. Accordingly, the tread portion 2 has a pair of shoulder land portions 5 extending between the shoulder longitudinal grooves 3 and the tread edges Te, and a pair of center land portions 6 extending between the center longitudinal groove 4 and the shoulder longitudinal grooves 3. Therefore, the tire 1 of the present embodiment includes the total four land portions on the tread portion 2.

The shoulder land portions 5 each have shoulder lateral grooves 7 spaced in the circumferential direction of the tire and extending from the shoulder longitudinal grooves 3 to the tread edges Te. Accordingly, the shoulder land portions 5 each forms a block row in which a plurality of shoulder blocks 8 divided by the shoulder longitudinal grooves 3, the tread edges Te, and the shoulder lateral grooves 7, is aligned in the circumferential direction of the tire.

The "tread edges" Te here are defined as an axially outermost ground-contact position where the tire 1 under an unloaded standard state, mounted on a standard wheel rim and inflated with a standard pressure, is grounded on a flat surface under standard load and at a camber angle of zero degree. In addition, an axial distance between the tread edges Te and Te is defined as ground-contact width TW. Dimensions and the like of parts of the tire have values under the standard state, unless otherwise stated.

The standard wheel rim is a wheel rim officially approved for the tire by standard organization, i.e. JATMA (Japan and Asia), T&RA (North America), ETRTO (Europe), STRO (Scandinavia) and the like. The standard wheel rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at various Cold Inflation Pressures" table in TRA or the like. In case of passenger car tires, however, the standard pressure is uniformly defined by 180 kPa.

The standard load is a tire load specified by the standard organization above. For example, the standard load is the "maximum load capacity" in JATMA, the "Load Capacity" in ETRTO, the maximum value given in the above-mentioned table in TRA or the like. In case of passenger car tires, however, the standard load is uniformly defined by 88% of the maximum tire load.

The shoulder longitudinal grooves 3 and the center longitudinal groove 4 of the present embodiment extend in a straight form along the circumferential direction of the tire. The thus configured longitudinal grooves 3 and 4 make it possible to suppress unstable behavior of a vehicle during braking, such as shaking and one-sided flow, and to smoothly discharge water from the longitudinal grooves 3 and 4 backward in the direction of rotation of the tire, which desirably improves the tire in steering stability and drainage performance.

Groove widths w1 and w2 of the shoulder longitudinal grooves 3 and the center longitudinal groove 4 and groove depths D1 and D2 (shown in FIG. 3) of the same, can be determined in various manners according to customary practice. However, if the groove widths w1 and w2 and/or the groove depths D1 and D2 are too large, the land portions 5 and 6 may become low in rigidity, and in contrast, if the groove widths w1 and w2 and/or the groove depths D1 and D2 are too small, the land portions 5 and 6 may become low in drainage performance. Accordingly, the groove widths w1 and w2 are desirably 2.5 to 7.5% of the ground-contact width TW, for example. The groove depths D1 and D2 are desirably 7.0 to 12.0 mm. Groove width W1 and W2 are measured in a right angle direction with respect to the longitudinal direction of grooves 3 and 4, which also applies to other grooves described later.

The shoulder longitudinal grooves 3 are each desirably disposed such that an axial distance L1 between a central line 1G of the shoulder longitudinal groove 3 and the tire equator C is preferably 15% or more of the ground-contact width TW, further preferably 20% or more, and preferably 35% or less, further preferably 30% or less. Setting the distance L1 in the foregoing range makes it possible to further improve a rigidity balance between the land portions 5 and 6 and enhance uneven wear resistance, steering stability, and the like.

To achieve more significantly the foregoing operation, a ratio Ls/Lc between a land portion width Lc of the center land portions 6 and a land portion width Ls of the shoulder land portions 5 is preferably 100% or more, further preferably 115% or more, and preferably 145% or less, further preferably 130% or less.

In addition, as shown in FIG. 2, the shoulder lateral grooves 7 of the present embodiment each include a first portion 11 which extends from the shoulder longitudinal groove 3 toward the axially outside of the tire and inclines at an angle θ1 of not less than 70 degrees and less than 90 degrees with respect to the circumferential direction of the tire, a second portion 12 which extends from the first portion 11 toward the axially outside of the tire and inclines to a reverse direction of the first portion 11 at an angle θ2 of from 40 to 70 degrees with respect to the circumferential direction of the tire, and a third portion 13 which extends from the second portion 12 toward the axially outside of the tire.

The thus configured shoulder lateral grooves 7 each have the first portion 11 inclined from the shoulder longitudinal grooves 3 at the large angle θ1 with respect to the circumferential direction of the tire, which allows water in the shoulder longitudinal grooves 3 to flow smoothly into the shoulder lateral grooves 7 due to a ground-contact pressure, thereby achieving improvement in drainage performance. In addition, the shoulder lateral grooves 7 each have a bent part formed by the first portion 11 and the second portion 12 extending in reverse directions, which delivers the drainage performance without dependence on the direction of rotation of the tire. Further, the angles θ1 and θ2 formed by the first portions 11 and the second portions 12 are limited to the foregoing ranges, which reduces anisotropy of the shoulder blocks 8 and thus improves uneven wear resistance. In particular, the angle θ2 of the second portions 12 inclines within the foregoing range, which improves drainage performance and uneven wear resistance in a balanced manner.

In this arrangement, if the angle θ1 of the first portions 11 becomes less than 70 degrees, water in the shoulder longitudinal grooves 3 is less prone to flow into the shoulder lateral grooves 7 at cornering of the vehicle. From this point of view, the angle θ1 is more preferably not less than 75 degrees. In addition, if the angle θ2 of the second portions 12 is less than 40 degrees, the shoulder blocks 8 become larger in anisotropy, which deteriorates uneven wear resistance. In contrast, if the angle θ2 exceeds 70 degrees, it is not possible to smoothly discharge water in the second portions 12 to the tread edges Te at straight running of the vehicle, and it is not possible to suppress transfer of resonance oscillation of air generated in the shoulder longitudinal grooves 3 (air column resonance) to the tread edges Te. From this point of view, the angle θ2 is more preferably not less than 45 degrees, and more preferably not more than 65 degrees.

If a difference θ1-θ2 between the angles θ1 and θ2 is large, there is a possibility that the shoulder blocks 8 become smaller in rigidity to thereby deteriorate uneven wear resistance. Accordingly, the angular difference θ1-θ2 is preferably not more than 40 degrees, more preferably not more than 30 degrees.

Figure 3:
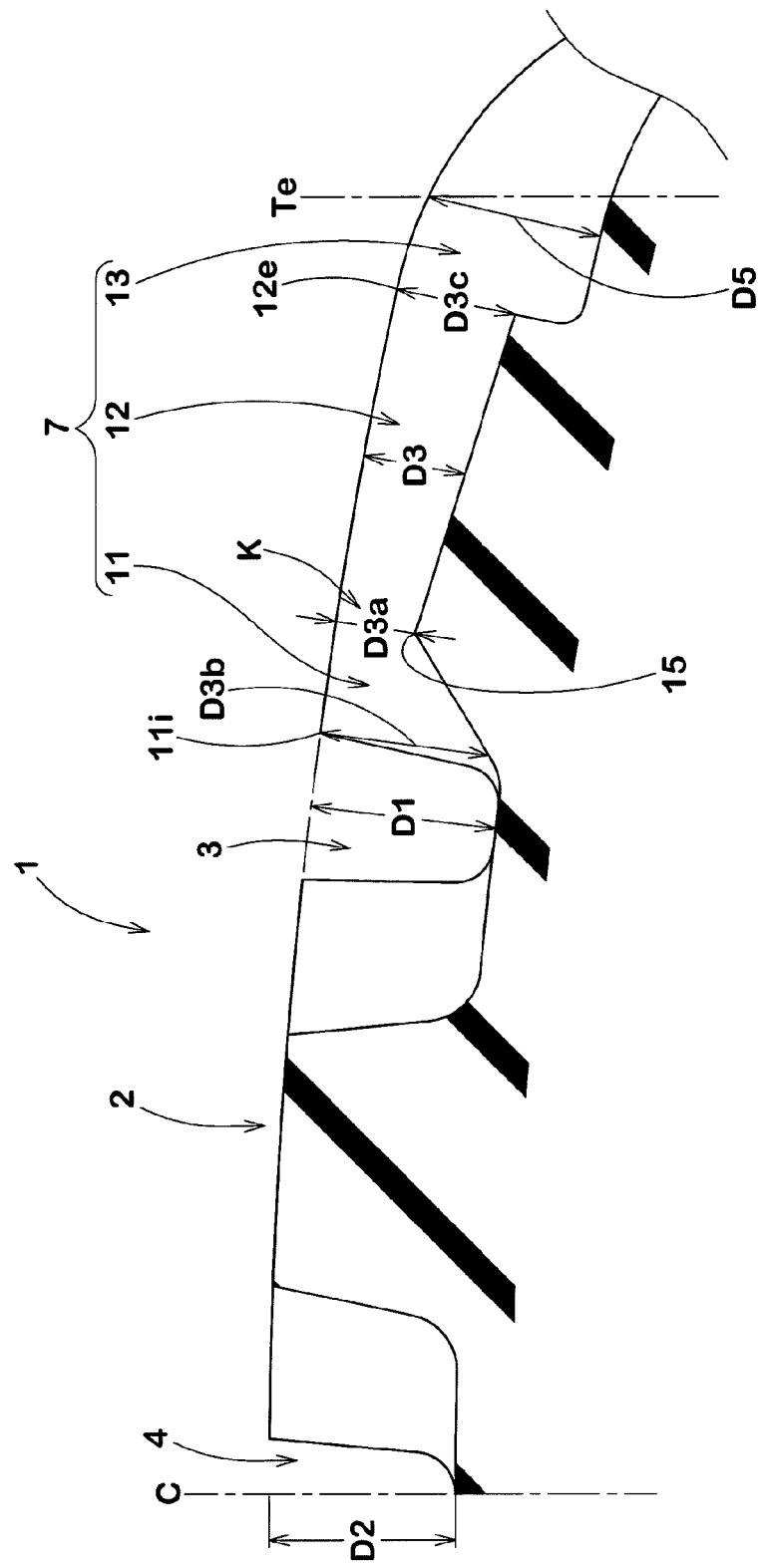
FIG. 3 is a cross sectional view of FIG. 2 taken along a line X-X.

As shown in FIGS. 2 and 3, the shoulder lateral grooves 7 each have a shallow part 15 with minimum groove depth D3a at a connection position K (that is, the bent part in the present embodiment) between the first portion 11 and the second portion 12. The thus configured shallow parts 15 enhance rigidity of the connection positions K and proximities thereof where stress concentration tends to occur due to the bending of the grooves, and improves the shoulder blocks 8 in uneven wear resistance. As shown in FIG. 3, the groove depth D3 of the shoulder lateral grooves 7 gradually increases from the shallow parts 15 toward axially inside and outside of the tire. This compensates for smaller groove capacity of the shallow parts 15, and therefore the total groove capacity of the shoulder lateral groves 7 is maintained or becomes larger. Accordingly, it is possible to smoothly discharge a large amount of water from the shoulder longitudinal grooves 3 toward the tread edges Te.

As in the foregoing, in the tire 1 of the present invention, the first portions 11 and the second portions 12 of the shoulder lateral grooves 7 at the shoulder land portions 5 are angled within specific ranges and are bent in reverse directions, and the groove depth of the bent parts is set minimum. This enhances drainage performance of the shoulder lateral grooves 7 while maintaining the rigidity of the shoulder land portions 5, thereby improving uneven wear resistance and drainage performance in a balanced manner.

If groove depth D3a of the shallow parts 15 becomes too small, there is a possibility that the shoulder lateral grooves 7 are deteriorated in drainage performance. Accordingly, the groove depth D3a of the shallow part 15 is preferably not less than 30% of the groove depth D1 of the shoulder longitudinal grooves 3, more preferably not less than 40%, and preferably not more than 50%, more preferably not more than 45% of the groove depth D1 of the shoulder longitudinal grooves 3.

Although not particularly limited, if groove depth D3b (shown in FIG. 3) of axially inner edges 11i of the first portions 11 is large, the axially inside of the shoulder land portions 5 tends to become excessively small in rigidity, and in contrast, if the groove depth D3b is small, the groove capacity of the shoulder lateral grooves 7 becomes small, which leads to deterioration in drainage performance. Accordingly, the groove depth D3b is preferably not less than 90% of the groove depth D1 of the shoulder longitudinal grooves 3, more preferably not less than 95%, and preferably 100% or less, more preferably not more than 98%. In the present embodiment, groove bottoms of the shoulder lateral grooves 7 are connected smoothly to groove bottoms of the shoulder longitudinal grooves 3.

From the same point of view, groove depth D3c (shown in FIG. 3) of axially outer edges 12e of the second portions 12 is preferably not less than 50% of the groove depth D1 of the shoulder longitudinal grooves 3, more preferably not less than 60%, and preferably not more than 80%, more preferably not more than 70%. In terms of assuring significant rigidity of the tread edges Te on which a large lateral force acts at cornering of the vehicle, the groove depth D3c is desirably smaller than the groove depth D3b of the axially inner edges 11i of the first portions 11.

At the shoulder lateral grooves 7 of the present embodiment, the groove width w3 of the first portions 11 and the groove width W4 of the second portions 12 are made substantially constant, and more preferably the groove width w3 is substantially identical with the groove width W4. The thus configured shoulder lateral grooves 7 prevent deterioration of drainage performance due to significant change in groove capacity. In addition, the shoulder lateral grooves 7 effectively enhance the rigidity of the shoulder land portions 5 without passing excessively resonance oscillation of air (air column resonance) generated in the shoulder longitudinal grooves 3. Therefore, the pneumatic tire 1 of the present embodiment improves drainage performance and uneven wear resistance without deteriorating noise performance. The groove widths W3 and W4 are considered as being "substantially identical" as described above, if the groove widths W3 and W4 are perfectly identical or a ratio w3/w4 between the groove widths w3 and w4 fall under a range of 80 to 120% in which the foregoing operation can be expected.

To attain the foregoing operation, the groove width w3 of the first portions 11 is preferably not less than 10% of circumferential pitch Pa of the shoulder lateral grooves 7, more preferably not less than 12%, and preferably not more than 15%, more preferably not more than 14%.

The first portions 11 and the second portions 12 desirably extend in a straight form as in the present embodiment. This achieves smooth drainage and assures the rigidity of the shoulder land portions 5, which leads to further enhancement in uneven wear resistance and drainage performance.

The axial length L4 of the second portions 12 is preferably two times the axial length L3 of the first portions, more preferably three times or more, and preferably seven times or less, more preferably six time or less. Specifically, if the length L4 becomes larger than seven times the length L3, the shoulder blocks are prone to generate anisotropy in rigidity, and in contrast, if the length L4 is smaller than two times, there is a possibility that smooth discharge to the tread edges Te cannot be realized.

The third portions 13 each desirably extend to the reverse direction of the second portions 12 at an angle θ3 of from 60 to 90 degrees with respect to the circumferential direction of the tire. The shoulder land portions 5 including the thus configured third portions 13, make it possible to discharge smoothly water in the shoulder lateral grooves 7 toward the tread edges Te without dependence on the direction of rotation of the tire, using a difference in ground-contact pressure between the shoulder land portions 5. If the angle θ3 is small, there is a possibility that rigidity of the tread edge Te on which a lateral force largely acts at cornering of the vehicle becomes lower. Accordingly, the angle θ03 is more preferably not more than 65 degrees.

In the present embodiment, the third portions 13 each have groove width w5 which become gradually larger with increasing proximity to the tread edges Te. Accordingly, water is smoothly discharged to the tread edges Te. In terms of assuring drainage performance and uneven wear resistance, the groove width w5 of the third portions 13 is preferably not less than 120% of the groove width w4 of the second portions 12, more preferably not less than 140%, and preferably not more than 200%, more preferably not more than 180% of the groove width w4 of the second portions 12. From the same point of view, groove depth D5 of the third portions 13 (shown in FIG. 3) is preferably not less than 70% of the groove depth D1 of the shoulder longitudinal grooves 3, more preferably not less than 80%, and preferably not more than 120%, more preferably not more than 110% of the groove depth D1 of the shoulder longitudinal grooves 3. The groove depth D5 is defined at the tread edges Te.

The shoulder blocks 8 are each provided with a plurality of (two in the present embodiment) semi-closed inside-shoulder sipes 16 extending from the axially outer edges 3e of the shoulder longitudinal grooves 3 toward the axially outside of the tire and terminated without reaching the tread edges Te. The inside-shoulder sipes 16 are desirably different in axial length to thereby provide a circumferential rigidity balance. For example, a ratio L6a/L6b between length L6a of one of the circumferentially disposed inside-shoulder sipes 16a and length L6b of the other one of the circumferentially disposed inside-shoulder sipes 16b is preferably not less than 0.80, more preferably not less than 0.90, and preferably not more than 1.25, more preferably not more than 1.15.

The shoulder blocks 8 are each provided with a semi-closed first shoulder sipe 17 extending from the tread edge Te toward the axially inside of the tire in a straight form and terminating without reaching the outer edge 3e and a semi-closed second shoulder sipe 18 bending and extending from the tread edge Te toward the axially inside of the tire and terminating without reaching the outer edge 3e.

The first shoulder sipe 17 has an axially inner end 17i disposed axially inwardly than the outer end 16e of the inside-shoulder sipe 16. The thus configured first shoulder sipe 17 has an edge effect while assuring the rigidity of the shoulder blocks 8, thereby improving steering stability and uneven wear resistance.

In addition, the inner ends 17i of the first shoulder sipes 17 are each circumferentially disposed between the one in-shoulder sipe 16 and the other in-shoulder sipe 16. The thus configured first shoulder sipes 17 further improve steering stability and uneven wear resistance.

The shoulder blocks 8 are each provided with the second shoulder sipe 18 to further enhance drainage performance.

To attain the foregoing operation, widths (not shown) of the inside-shoulder sipes 16, the first shoulder sipes 17, and the second shoulder sipes 18 are each preferably not less than 0.2 mm, more preferably not less than 0.5 mm, and preferably not more than 1.5 mm, more preferably not more than 1.0 mm. In addition, sipe depth (not shown) is preferably not less than 3.0 mm, more preferably not less than 4.0 mm, and preferably not more than 8.0 mm, more preferably not more than 7.0 mm.

The center land portions 6 are each provided with first lug grooves 20 which incline and extend in a short length from the center longitudinal groove 4 toward the axially outside of the tire on one side with respect to the axial direction of the tire, and second lug grooves 21 extending on one side in a short length from the shoulder longitudinal grooves 3 toward the tire equator C. Further, the center land portions 6 are each provided with first main sipes 22 which connect the first lug grooves 20 and the second lug grooves 21 and incline on the one side, and second main sipes 23 which connect the first lug grooves 20 and the second lug grooves 21 and incline on the other side with respect to the axial direction of the tire. The thus configured center land portions 6 make it possible to effectively discharge a water film on the center land portions 6 by the first and second lug grooves 20 and 21, and to further improve drainage performance by the first and second main sipes 22 and 23 without excessively deteriorating the rigidity of the center land portions 6.

In addition, the center land portions 6 are each provided with semi-closed center edge sipes 24 extending in a short length from both axial land portion edges 6e and 6e toward the center of the center land portion 6, and closed center sub sipes 25 straddling in a short length the center first main sipes 22. The thus configured center edge sipes 24 and center sub sipes 25 improve drainage performance while assuring the rigidity of the center land portions 6.

As in the foregoing, a preferred embodiment of the present invention is described above. However, the present invention is not limited to the illustrated embodiment, and can be modified and carried out in various manners.

Comparative Test:
Pneumatic tires (size: 195/80R15 107/105L LT) were manufactured so as to have the pattern shown in FIG. 1 and be compliant with specifications shown in Table 1, and were tested for performance items shown below. Common specifications are as follows:
Ground-contact width: 145 mm
Center Longitudinal Groove
  Groove width w1/ground-contact width TW: 4.0%
  Groove depth D1: 9.7 mm
  Angle with respect to tire equator C: 0 degree
Shoulder Longitudinal Grooves
  Groove width w2/ground-contact width TW: 5.5%
  Groove depth D2: 9.7 mm
  Angle with respect to tire equator C: 0 degree
First Portions
  Groove width w3: 5.5 mm
Second Portions
  Groove width W4: 5.5 mm
Third Portions
  Groove width W5: 6.0 to 9.0 mm
  Groove depth D5/D1 at tread edge: 97%
Others
Sipes
  Width: 0.3 to 0.5 mm
  Sipe depth: 5.5 to 8.5 mm
  Test procedures are as described below.
Uneven Wear Resistance:
  The sample tires were mounted on all wheels of a vehicle (FR car made in Japan with a displacement of 2,000 cc), under conditions of rims with 6.0 J and an internal pressure of 450 kPa, and driven for 30 km by limit running in a tire test course, and then were visually observed for breakage of blocks, presence or absence of uneven wear, and the like. Evaluation results are shown with an index of 100 representing a value in comparative example 1. Larger values are more favored in uneven wear resistance.
Drainage Performance:
  The foregoing test vehicle was entered into a course with a water puddle 10 mm deep and 20 m long, on an asphalt road surface with a radius of 100 m, with stepwise speed increase. Then, lateral acceleration (lateral G) of the vehicle was measured, and average lateral G of the front wheels at speeds of 50 to 80 km/h was calculated. Calculation results are shown with an index of 100 representing a value in comparative example 1. Larger values are more favored.
Noise Performance:
  The foregoing test vehicle was run at a speed of 60 km/h on a road noise measurement road (rough asphalt road surface), and in-vehicle noise was picked up through a microphone installed near the driver's ear on the window side, and then a sound pressure level of a peak value of air column resonance was measured around a narrow band of 240 Hz. Evaluation results are shown with an index of 100 representing a value in comparative example 1. Larger values are more favored.
  Test results are provided in Table 1.

TABLE 1

Figure 4:
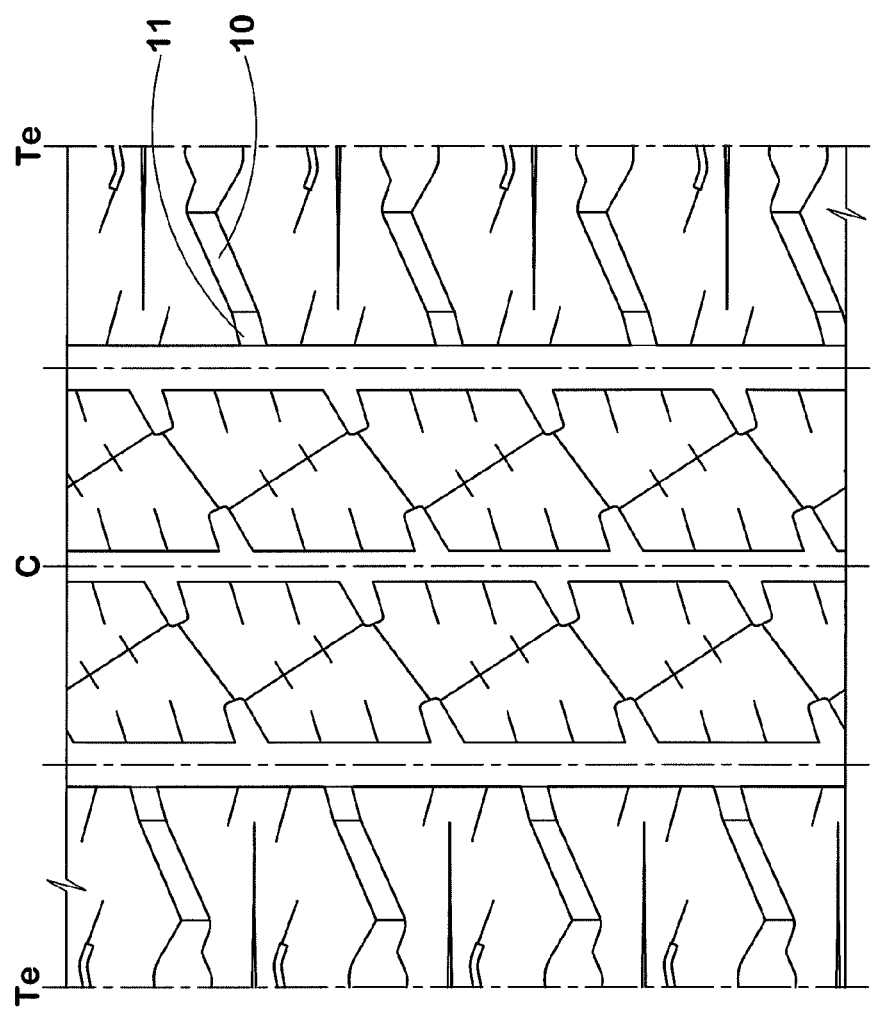
FIG. 4 is a development view of a tread portion in a comparative example.

|  | Comparative example 1 | Example 1 | Comparative example 2 | Example 2 | Example 3 | Example 4 | Comparative example 3 | Example 5 |
|---|---|---|---|---|---|---|---|---|
| Drawing indicating shape of tread portion | FIG. 4 | FIG. 1 | FIG. 1 | FIG. 1 | FIG. 1 | FIG. 1 | FIG. 1 | FIG. 1 |
| Angle θ1 of first portion (degrees) | 85 | 85 | 65 | 70 | 75 | 80 | 85 | 85 |
| Angle θ2 of second portion (degrees) | 55 | 55 | 55 | 55 | 55 | 55 | 35 | 40 |
| Groove depth of shallow part D3a/D1 (%) | 43 | 43 | 43 | 43 | 43 | 43 | 43 | 43 |
| Groove depth of inner edge of first portion D3b/D1 (%) | 95 | 95 | 95 | 95 | 95 | 95 | 95 | 95 |
| Groove depth of outer edge of second portion D3c/D1 (%) | 65 | 65 | 65 | 65 | 65 | 65 | 65 | 65 |
| Ratio L4/L3 in axial length between first and second portions (times) | 4.5 | 4.5 | 4.5 | 4.5 | 4.5 | 4.5 | 4.5 | 4.5 |
| Ratio W3/W4 in groove width between first and second portions (%) | 100 | 100 | 100 | 100 | 100 | 100 | 100 | 100 |
| uneven wear resistance [larger index/value is better] | 100 | 140 | 140 | 140 | 140 | 140 | 110 | 125 |
| Noise performance (air column resonance) [larger index/value is better] | 100 | 101 | 101 | 101 | 101 | 101 | 101 | 101 |
| Drainage performance [larger index/value is better] | 100 | 100 | 90 | 94 | 95 | 97 | 100 | 100 |

|  | Example 6 | Example 7 | Example 8 | Comparative example 4 | Example 9 | Example 10 | Example 11 | Example 12 |
|---|---|---|---|---|---|---|---|---|
| Drawing indicating shape of tread portion | FIG. 1 | FIG. 1 | FIG. 1 | FIG. 1 | FIG. 1 | FIG. 1 | FIG. 1 | FIG. 1 |
| Angle θ1 of first portion (degrees) | 85 | 85 | 85 | 85 | 85 | 85 | 85 | 85 |
| Angle θ2 of second portion (degrees) | 50 | 60 | 70 | 75 | 55 | 55 | 55 | 55 |

TABLE 1-continued

|  | Example 13 | Example 14 | Example 15 | Example 16 | Example 17 | Example 18 | Example 19 | Example 20 |
|---|---|---|---|---|---|---|---|---|
| Groove depth of shallow part D3a/D1 (%) | 43 | 43 | 43 | 43 | 20 | 35 | 47 | 60 |
| Groove depth of inner edge of first portion D3b/D1 (%) | 95 | 95 | 95 | 95 | 95 | 95 | 95 | 95 |
| Groove depth of outer edge of second portion D3c/D1 (%) | 65 | 65 | 65 | 65 | 65 | 65 | 65 | 65 |
| Ratio L4/L3 in axial length between first and second portions (times) | 4.5 | 4.5 | 4.5 | 4.5 | 4.5 | 4.5 | 4.5 | 4.5 |
| Ratio W3/W4 in groove width between first and second portions (%) | 100 | 100 | 100 | 100 | 100 | 100 | 100 | 100 |
| Uneven wear resistance [larger index/value is better] | 130 | 135 | 140 | 140 | 140 | 140 | 135 | 120 |
| Noise performance (air column resonance) [larger index/value is better] | 101 | 101 | 101 | 98 | 101 | 101 | 101 | 101 |
| Drainage performance [larger index/value is better] | 100 | 100 | 97 | 90 | 96 | 97 | 100 | 105 |

|  | Example 13 | Example 14 | Example 15 | Example 16 | Example 17 | Example 18 | Example 19 | Example 20 |
|---|---|---|---|---|---|---|---|---|
| Drawing indicating shape of tread portion | FIG. 1 | FIG. 1 | FIG. 1 | FIG. 1 | FIG. 1 | FIG. 1 | FIG. 1 | FIG. 1 |
| Angle θ1 of first portion (degrees) | 85 | 85 | 85 | 85 | 85 | 85 | 85 | 85 |
| Angle θ2 of second portion (degrees) | 55 | 55 | 55 | 55 | 55 | 55 | 55 | 55 |
| Groove depth of shallow part D3a/D1 (%) | 43 | 43 | 43 | 43 | 43 | 43 | 43 | 43 |
| Groove depth of inner edge of first portion D3b/D1 (%) | 85 | 90 | 100 | 105 | 95 | 95 | 95 | 95 |
| Groove depth of outer edge of second portion D3c/D1 (%) | 65 | 65 | 65 | 65 | 45 | 55 | 75 | 85 |
| Ratio L4/L3 in axial length between first and second portions (times) | 4.5 | 4.5 | 4.5 | 4.5 | 4.5 | 4.5 | 4.5 | 4.5 |
| Ratio W3/W4 in groove width between first and second portions (%) | 100 | 100 | 100 | 100 | 100 | 100 | 100 | 100 |
| Uneven wear resistance [larger index/value is better] | 140 | 140 | 135 | 120 | 130 | 135 | 130 | 125 |
| Noise performance (air column resonance) [larger index/value is better] | 101 | 101 | 101 | 98 | 101 | 101 | 101 | 101 |
| Drainage performance [larger index/value is better] | 95 | 97 | 100 | 105 | 100 | 103 | 103 | 105 |

|  | Example 21 | Example 22 | Example 23 | Example 24 | Example 25 | Example 26 | Example 27 | Example 28 |
|---|---|---|---|---|---|---|---|---|
| Drawing indicating shape of tread portion | FIG. 1 | FIG. 1 | FIG. 1 | FIG. 1 | FIG. 1 | FIG. 1 | FIG. 1 | FIG. 1 |
| Angle θ1 of first portion (degrees) | 85 | 85 | 85 | 85 | 85 | 85 | 85 | 85 |
| Angle θ2 of second portion (degrees) | 55 | 55 | 55 | 55 | 55 | 55 | 55 | 55 |
| Groove depth of shallow part D3a/D1 (%) | 43 | 43 | 43 | 43 | 43 | 43 | 43 | 43 |
| Groove depth of inner edge of first portion D3b/D1 (%) | 95 | 95 | 95 | 95 | 95 | 95 | 95 | 95 |
| Groove depth of outer edge of second portion D3c/D1 (%) | 65 | 65 | 65 | 65 | 65 | 65 | 65 | 65 |
| Ratio L4/L3 in axial length between first and second portions (times) | 1.5 | 2.0 | 7.0 | 7.5 | 4.5 | 4.5 | 4.5 | 4.5 |
| Ratio W3/W4 in groove width between first and second portions (%) | 100 | 100 | 100 | 100 | 75 | 80 | 125 | 130 |
| Uneven wear resistance [larger index/value is better] | 135 | 135 | 120 | 115 | 140 | 140 | 130 | 120 |
| Noise performance (air column resonance) [larger index/value is better] | 101 | 101 | 101 | 101 | 105 | 100 | 98 | 97 |
| Drainage performance [larger index/value is better] | 95 | 96 | 105 | 110 | 94 | 95 | 105 | 110 |

\* D1: Groove depth of shoulder longitudinal grooves
Groove depths of first and second portions change smoothly.

As the result of the test, it has been confirmed that the tires in the examples are improved in various performance items as compared to the comparative examples.

What is claimed is:
1. A pneumatic tire comprising
a tread portion comprising a shoulder main groove and a plurality of shoulder lateral grooves,
the shoulder main groove being disposed in the nearest side of a tread edge on the tread portion and extending continuously in a circumferential direction of the tire,
the shoulder lateral grooves each extending from the shoulder main groove to the tread edge to form a plurality of shoulder blocks between the shoulder main groove and the tread edge, wherein at least one of the shoulder lateral grooves comprises a first portion which extends axially outwardly from the shoulder main groove and is inclined at an angle of not less than 70 degrees and less than 90 degrees with respect to a circumferential direction of the tire and a second portion which extends axially outwardly from the first portion and is inclined in a reverse direction of the first portion at an angle of from 40 to 70 degrees with respect to the circumferential direction of the tire, said at least one of the shoulder lateral grooves has a shallow part having a minimum groove depth at a connection position between the first portion and the second portion, wherein the shoulder lateral groove has the minimum groove depth only at the connection position between the first portion and the second portion, and the groove depth of the shoulder lateral groove increases from the shallow part toward axially inside and outside of the tire.

2. The pneumatic tire according to claim 1, wherein an axial length of the second portion is in a range of from 2 to 7 times an axial length of the first portion.

3. The pneumatic tire according to claim 1 or 2, wherein the shoulder lateral groove has a constant groove width at least at the first portion and the second portion.

4. The pneumatic tire according to claim 1, wherein the first portion and the second portion each extends in a straight form.

5. The pneumatic tire according to claim 1, wherein a groove depth at an axially inner edge of the first portion is in a range of from 90% to 100% of a groove depth of the shoulder main groove.

6. The pneumatic tire according to claim 1, wherein said at least one of the shoulder lateral grooves comprises a third portion which extends axially outwardly from the second portion and is inclined in a reverse direction of the second portion at an angle of from 60 to 90 degrees with respect to the circumferential direction of the tire.

\* \* \* \* \*